(12) United States Patent
Inoue et al.

(10) Patent No.: US 7,102,537 B2
(45) Date of Patent: Sep. 5, 2006

(54) COMMUNICATION DEVICE USING AN UWB WIRELESS WAVE

(75) Inventors: Hiroto Inoue, Shinagawa (JP); Takashi Arita, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 124 days.

(21) Appl. No.: 10/781,797

(22) Filed: Feb. 20, 2004

(65) Prior Publication Data

US 2005/0068225 A1 Mar. 31, 2005

(30) Foreign Application Priority Data

Sep. 25, 2003 (JP) .............................. 2003-333172

(51) Int. Cl.
*G08G 1/16* (2006.01)
(52) U.S. Cl. ....................... 340/903; 340/435; 701/301
(58) Field of Classification Search ................. 340/435
See application file for complete search history.

(56) References Cited

U.S. PATENT DOCUMENTS

| 5,687,169 | A  | * | 11/1997 | Fullerton ..................... 370/324 |
| 6,031,862 | A  | * | 2/2000  | Fullerton et al. ........... 375/146 |
| 6,297,773 | B1 | * | 10/2001 | Fullerton et al. ........... 342/457 |
| 6,300,903 | B1 | * | 10/2001 | Richards et al. ............ 342/450 |
| 6,611,234 | B1 | * | 8/2003  | Fullerton et al. ........... 342/458 |
| 6,614,384 | B1 | * | 9/2003  | Hall et al. ..................... 342/28 |
| 6,822,604 | B1 | * | 11/2004 | Hall et al. ..................... 342/28 |
| 6,900,740 | B1 | * | 5/2005  | Bloomquist et al. ........ 340/905 |
| 2004/0240565 | A1 | * | 12/2004 | Santhoff et al. ............ 375/259 |
| 2005/0275513 | A1 | * | 12/2005 | Grisham et al. ............ 340/435 |

FOREIGN PATENT DOCUMENTS

| JP | 4-286981 | 10/1992 |
| JP | 11-3498 | 1/1999 |
| WO | 94/24579 | 10/1994 |

\* cited by examiner

*Primary Examiner*—Daniel Wu
*Assistant Examiner*—Eric M. Blount
(74) *Attorney, Agent, or Firm*—Staas & Halsey LLP

(57) ABSTRACT

A communication device is disclosed which is comprised of: a transmitter for transmitting an ultra wide band wireless wave pulse; multiple receivers which are disposed equidistant from the transmitter and receive the ultra wide band wireless wave pulse; and distance-measuring equipment which detects a distance or a direction to an object by measuring time intervals between the first reception times when receivers receive the ultra wide band wireless wave pulse directly from the transmitter and the second reception times when the receivers receive a object-reflected wave of the ultra wide band wireless wave pulse.

3 Claims, 18 Drawing Sheets

COMMUNICATION DEVICE USING AN UWB WIRELESS WAVE

BACKGROUND OF THE INVENTION

1. Field of the Invention

The present invention relates to a communication device, a vehicle-installed system, a communication system, and an anti-theft system, in particular to the same that utilize an ultra wide band (UWB) wireless wave.

2. Description of the Related Art

A UWB wireless system is a wireless system in which communication is carried out by using significantly wide-range frequency-band and narrow pulses of about several GHz or several tens of GHz and less than 1 ns.

FIG. 1 shows a wave shape of transmitted data of the wireless communication system and FIG. 2 shows a frequency band of the wireless communication system. FIG. 1B illustrates the wave shape of PSK (phase sift keying) and FIG. 1A illustrates the wave shape of UWB.

Communication is carried out by generating a narrow-wide pulse, called as an impulse, in a data train that is less than 1 ns. Since the UWB system can avoid the necessity for continuously generating a carrier as in the PSK system shown in FIG. 1B, it requires less power consumption than the communication system in which information is superimposed on a carrier such as PSK.

Further, a narrow pulse, which is used in the UWB system, has good permeability of being able to pass through a wall such as a gypsum-board wall, a wood wall, a concrete wall and others. For this reason, various applications have been examined.

However, since the transmit power is restrained up to a radiation electromagnetic noise limit level in the UWB system, as shown in FIG. 2, there has been no other choice but to shorten the communication distance.

With respect to the prior art, reference may be made to JP08-511341 A, which discloses a radar using the UWB system.

A traditional UWB wireless system has its application area in radar system art. However, since the communication distance is short, application to typical radar system or communication system involves difficulties.

Therefore, it is a general object of the present invention to provide a communication device, a vehicle-installed system, a communication system, and an anti-theft system that can make advantageous use of the characteristics of the UWB communication system.

SUMMARY OF THE INVENTION

In accordance with an aspect of the present invention, there is provided a communication system using UWB communication, comprising: a detector, which detects a distance and a direction to an obstacle near by transmitting and receiving an ultra wide band wireless wave pulse; a communication device which communicates with a vehicle located in the vicinity of the communication device by using the UWB communication; an interface for interfacing with a user; and an internal communication network in which communication between the detector, the communication device and the interface is performed using UWB communication.

In accordance with another aspect of the present invention, there is provided a distance-measuring system for measuring a distance and a direction to an object, comprising: transmitting means for transmitting an ultra wide band wireless wave pulse; a plurality of receiving means for receiving a reflected wave of the ultra wide band wireless wave pulse transmitted by the transmitting means; and determining means for determining the distance and the direction to the object based on an interval from the transmitting time when the ultra wide band wireless wave pulse is transmitted by the transmitting means to the receiving time when the reflected wave of the ultra wide band wireless wave pulse is received by the plurality of receiving means.

In accordance with another aspect of the present invention, there is provided a position detection system, comprising: a tag allocated for an object and a detector for detecting a position of the tag, wherein the detector is comprised of response request means for transmitting a response request using an ultra wide band wireless wave pulse in response to an instruction to locate the object; a plurality of receiving means for receiving an ultra wide band wireless wave pulse transmitted by the tag as a response; and position detecting means for detecting a position of the tag according to the ultra wide band wireless wave pulse received by the plurality of receiving means. The tag is comprised of receiving means for receiving the response request from the response request means of the detector; and response means for sending a response using an ultra wide band wireless wave pulse in response to the ultra wide band wireless wave pulse of the response request received by the receiving means of the tag.

In accordance with another aspect of the present invention, there is provided a communication method, comprising: providing a plurality of moving objects with communication devices, each of which enables communication in a predetermined area, wherein information is shared by using the plurality of communication devices installed in the respective moving objects when the respective predetermined areas of the communication devices overlap one another.

As has been discussed, the present invention is characterized in that the characteristics of the ultra wide band communication are made effective use of. According to the present invention, it becomes possible to precisely and reliably detect objects located in a relatively close position by transmitting an ultra wide band wireless wave pulse using a transmitter, receiving the ultra wide band wireless wave pulse using a plurality of receivers disposed equidistant from the transmitter, measuring the time interval between the time when the ultra wide band wireless wave pulse is received directly by the plurality of receivers and the time when the ultra wide band wireless wave pulse is received by the plurality of receivers after being reflected by the object, and detecting the relative distance with respect to the object and/or a direction to and/or a size of the object according to the time intervals measured at the plurality of receivers.

BRIEF DESCRIPTION OF THE DRAWINGS

Other objects, advantages, and further features of the present invention will become more apparent as the description proceeds taken in conjunction with the accompanying drawings in which.

DETAILED DESCRIPTION OF THE PREFERRED EMBODIMENT

Figure 1:
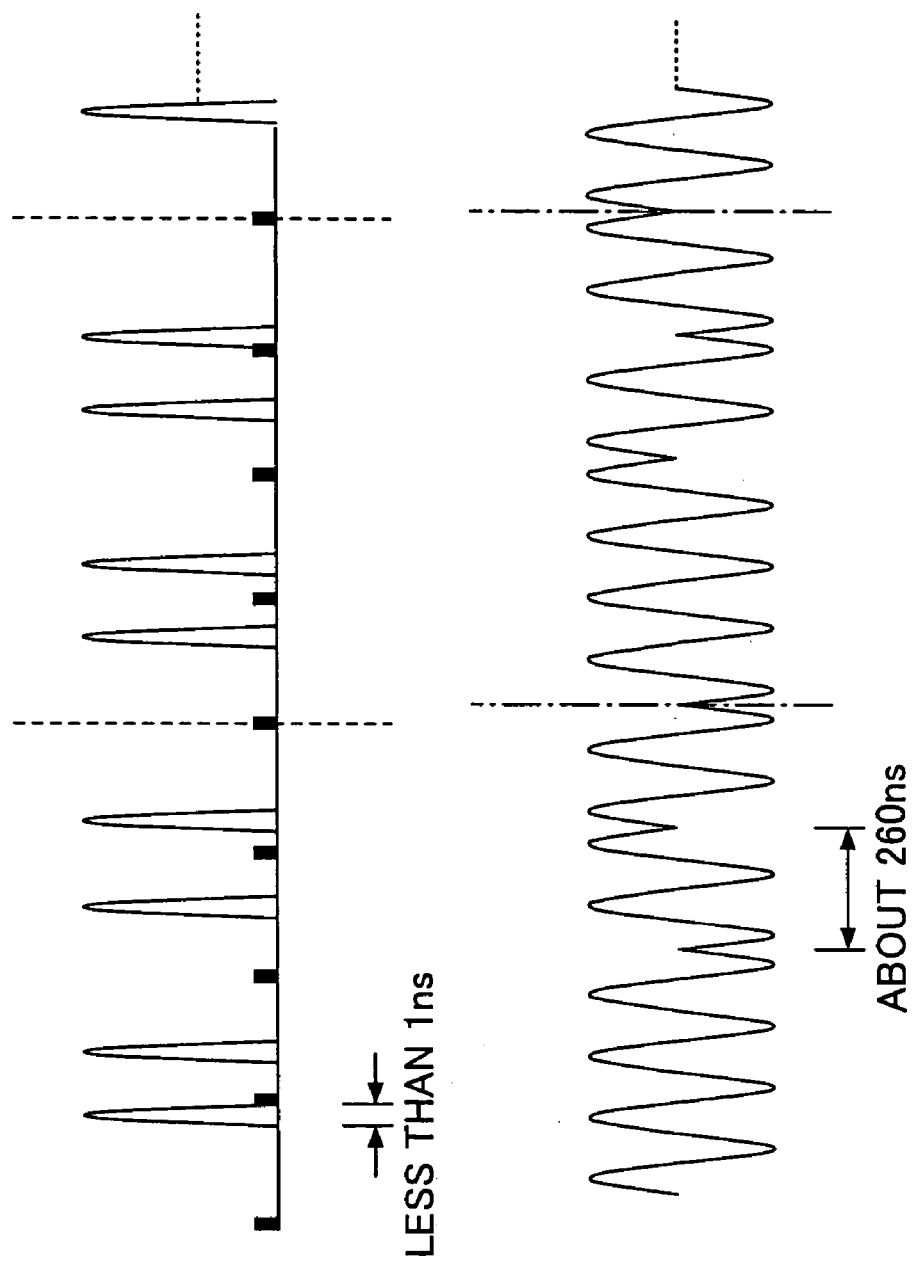
FIGS. 1A and 1B show a wave shape of transmitted data of the wireless communication system.
Figure 2:
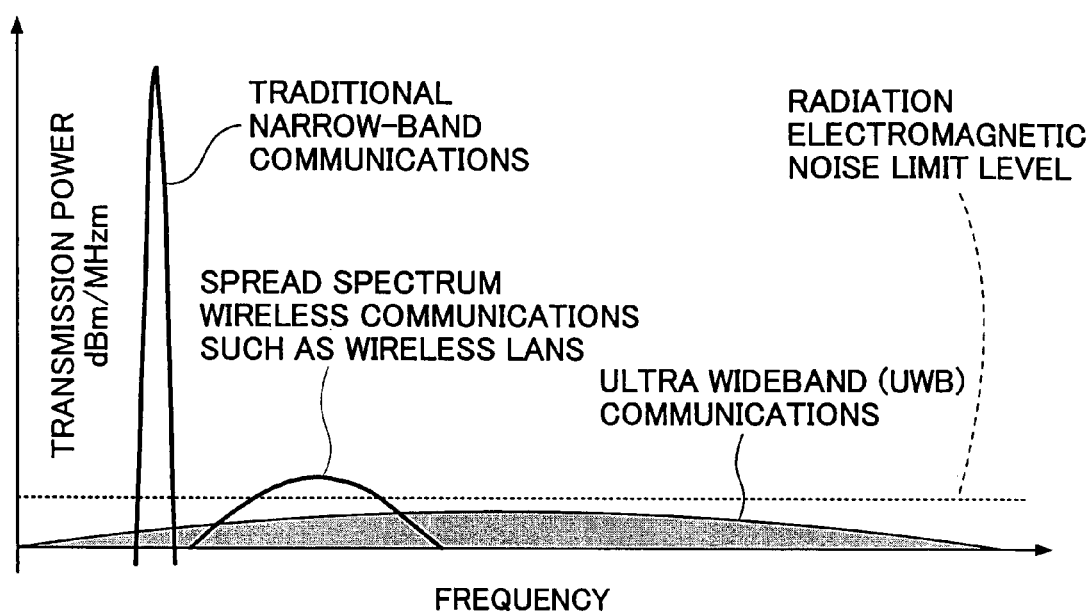
FIG. 2 shows a frequency band of the wireless communication system.
Figure 3:
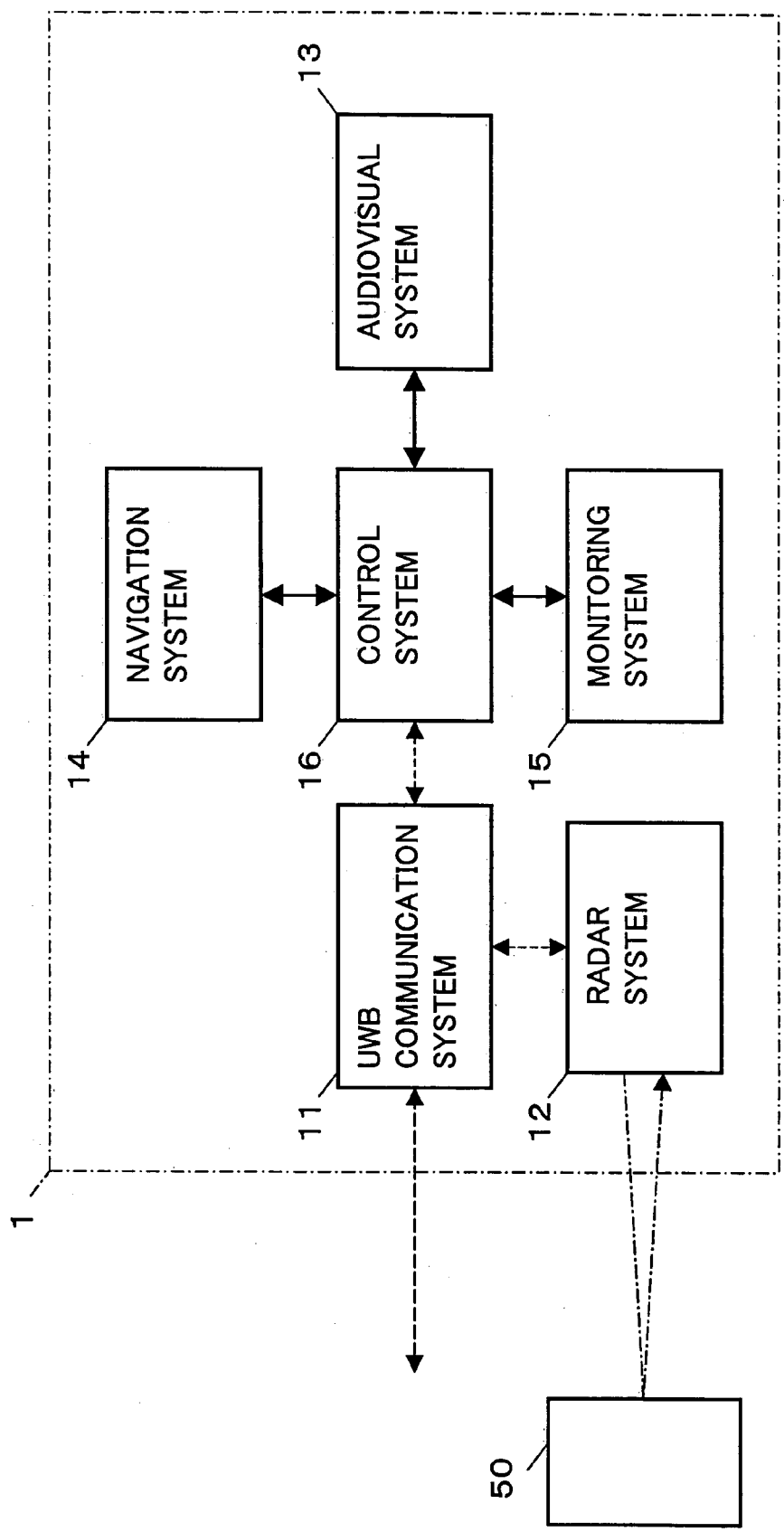
FIG. 3 shows a block diagram of an embodiment of a system configuration according to the present invention.

FIG. 3 shows an embodiment of a system configuration according to the present invention. In this system configuration, on a vehicle 1 are installed vehicle-installed devices such as an ultra wide band (UWB) communication system 11, a radar system 12, an audiovisual system 13, a navigation system 14, a monitoring system 15, a control system 16, and so on.

The UWB communication system 11 is a system that utilizes an ultra wide band wireless wave pulse (hereafter "UWB wireless wave pulse") to implement various functions such as a distance-measuring function, an inter-vehicle communication function, an anti-theft function, etc.

The radar system 12 is the system that detects an obstacle ahead of the vehicle using a radar wave.

The audiovisual system 13 is a system for playing an audiovisual content, which includes an audio system for playing a music CD such as a CD player and a visual system such as a television monitor.

The navigation system 14 is a system that receives satellite signals from GPS (global positioning system) satellites to detect a current position of the vehicle and display the current position on a map displayed on the monitor and the route for guiding the vehicle from the current position to the destination.

The monitoring system 15 is a system for monitoring the back of the vehicle using a camera such as a television camera and for generating an alarm indicating that the vehicle is being stolen.

The control system 16 is a system that controls the UWB communication system 11, the radar system 12, the audio-visual system 13, the navigation system 14, the monitoring system 15 and the like.

Figure 4:
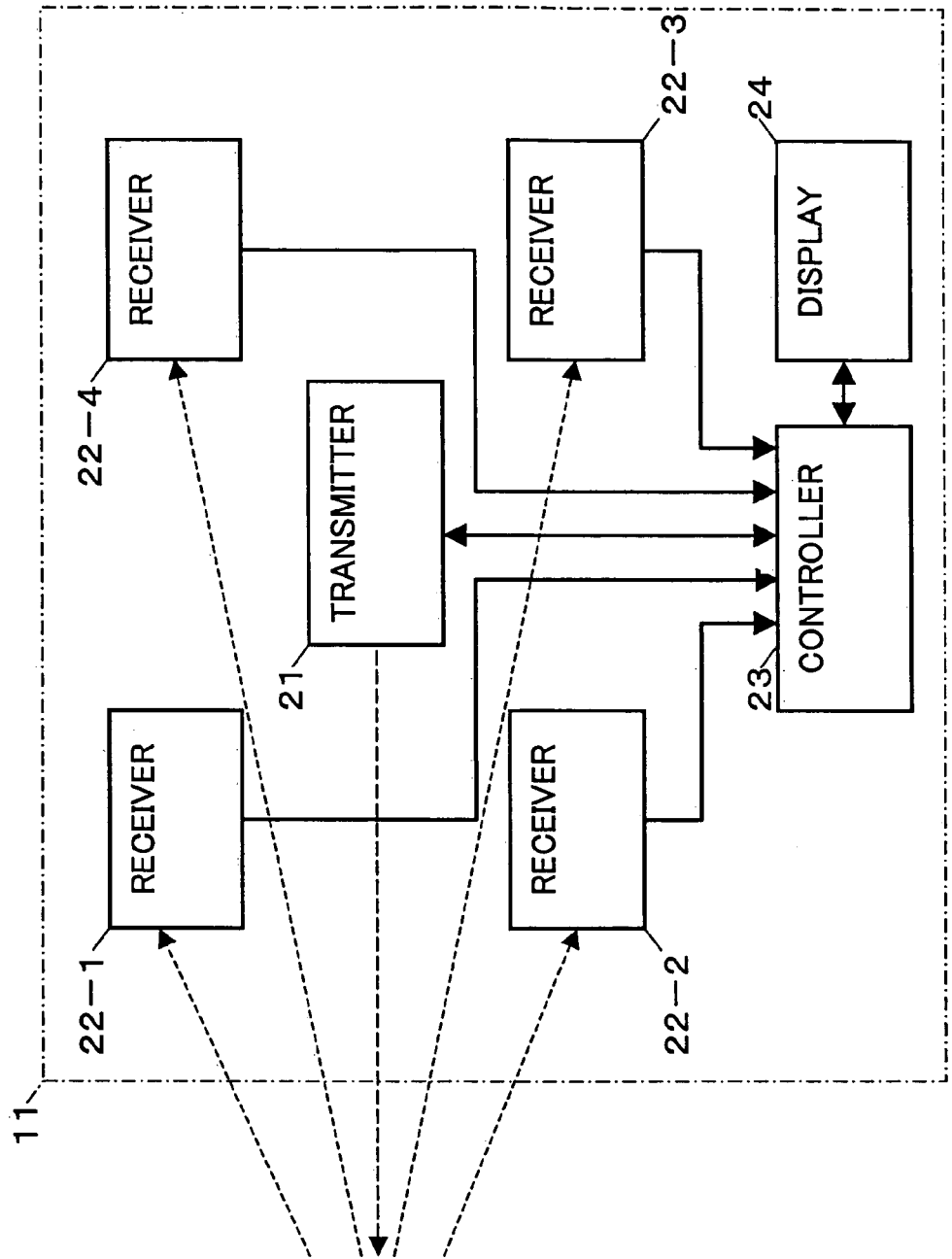
FIG. 4 shows a block diagram of the UWB communication system 11.

FIG. 4 shows a block diagram of the UWB communication system 11. This UWB communication system 11 has a transmitter 21, receivers 22-1~22-4, a controller 23, and a display 24, and has a distance-measuring function, an inter-vehicle communication function, and an anti-theft function.

The transmitter 21 is disposed on the central portion of the vehicle and outputs the UWB wireless wave pulse in response to the transmission signal from the controller 23.

Figure 5:
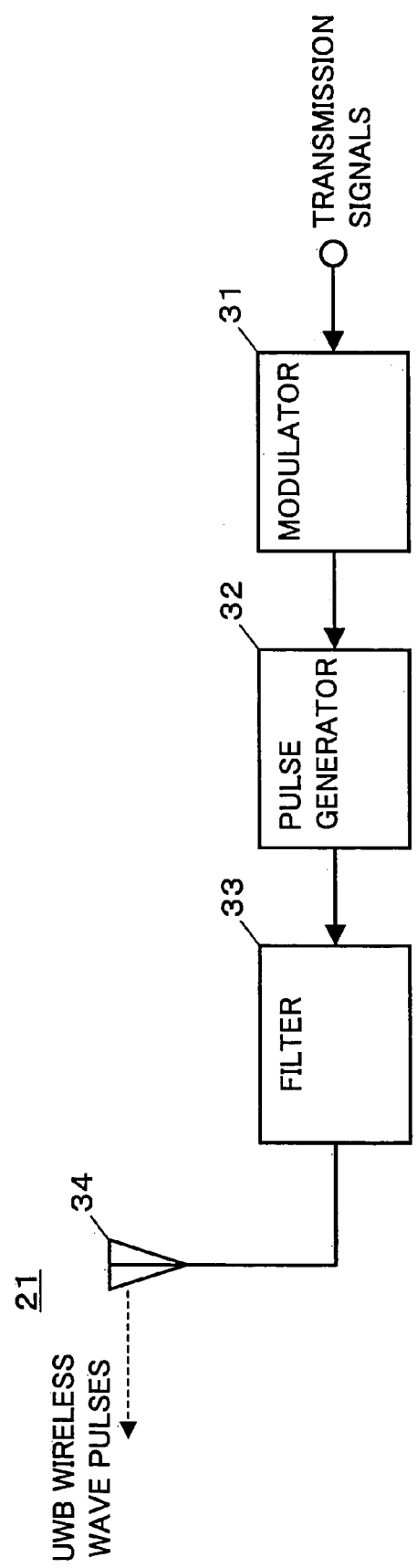
FIG. 5 shows a block diagram of the transmitter 21.

FIG. 5 shows a block diagram of the transmitter 21. The transmitter 21 is comprised of a modulator 31, a pulse generator 32, a filter 33, and an antenna 34. The modulator 31 modulates the transmission signal into a modulated code for facilitating the pulse generation. The signal modulated by the modulator 31 is supplied to the pulse generator 32. The pulse generator 32 generates a pulse signal in response to the signal from the modulator 31.

The pulse generated in the pulse generator 32 is sent to the filter 33. The filter 33 sends the pulse signal to the antenna 34 after filtering out unnecessary components. The antenna 34 radiates an electromagnetic wave in accordance with the pulse output from the filter 33.

In this way, the UWB wireless wave pulses in accordance with the transmission signals are sent.

The receivers 22-1~22-4 receive the UWB wireless wave pulses.

Figure 6:
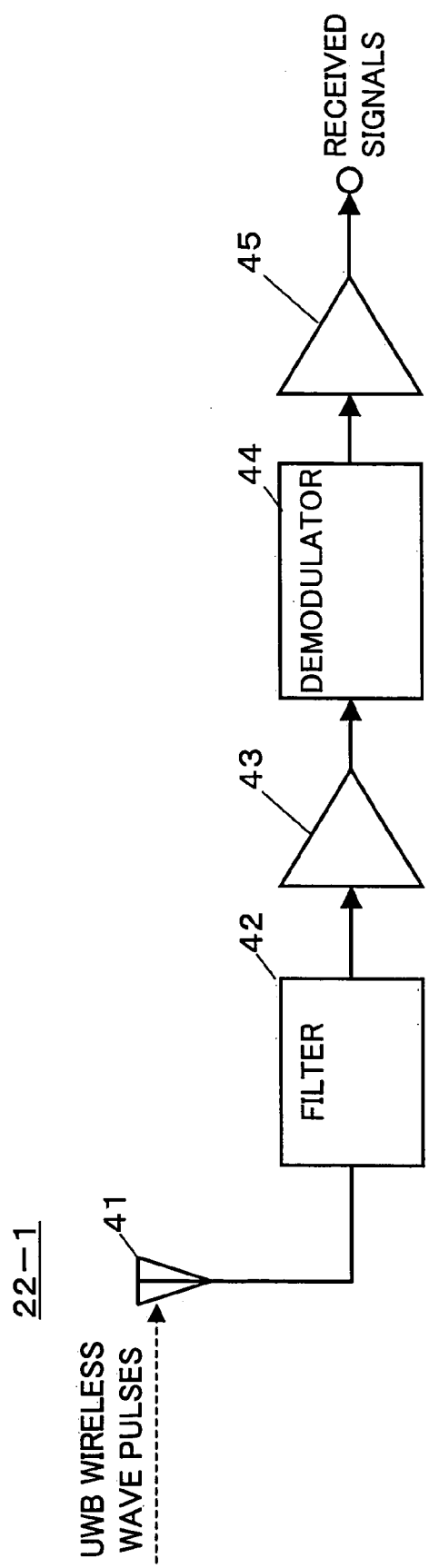
FIG. 6 shows a block diagram of the receivers 22-1.

FIG. 6 shows a block diagram of the receiver 22-1. The receiver 22-1 comprises an antenna 41, a filter 42, a low-noise amplifier 43, a demodulator 44, and an output amplifier 45. The antenna 41 receives the UWB wireless wave pulse. The signal received by the antenna 41 is sent to the filter 42. The filter 42 filters out the unnecessary components from the received signal. The filtered signal is sent to a low-noise amplifier 43. The low-noise amplifier 43 amplifies the filtered signal from the filter 42 and sent it to the demodulator 44. The demodulator 44 is a circuit for demodulating the signal from the low-noise amplifier 43 to obtain the original signal thereof. The construction and arrangement of the other receivers 22-2~22-n may be the same as that of the receiver 22-1.

The receivers 22-1~22-4 are disposed on points on the circumference of a circle at a distance r from the location of the transmitter 21. The receivers 22-1~22-4 receive the UWB wireless wave pulses. The signals detected by the receivers 22-1~22-4 are sent to the controller 23.

The controller 23 controls the transmitter 21, the receivers 22-1~22-4, and the display 24 to perform the distance-measuring function, the inter-vehicle communication function, and the anti-theft function.

The display 24 may be a LCD (liquid crystal device) and the like and is connected to the UWB communication system 11. The display 24 displays the information such as the distance-measuring result derived from the distance-measuring function of the UWB communication system 11, the information acquired from other electronics through the inter-vehicle communication function, and the images supplied from the audiovisual system 13, the navigation system 14, and the monitoring system 15.

Figure 7:
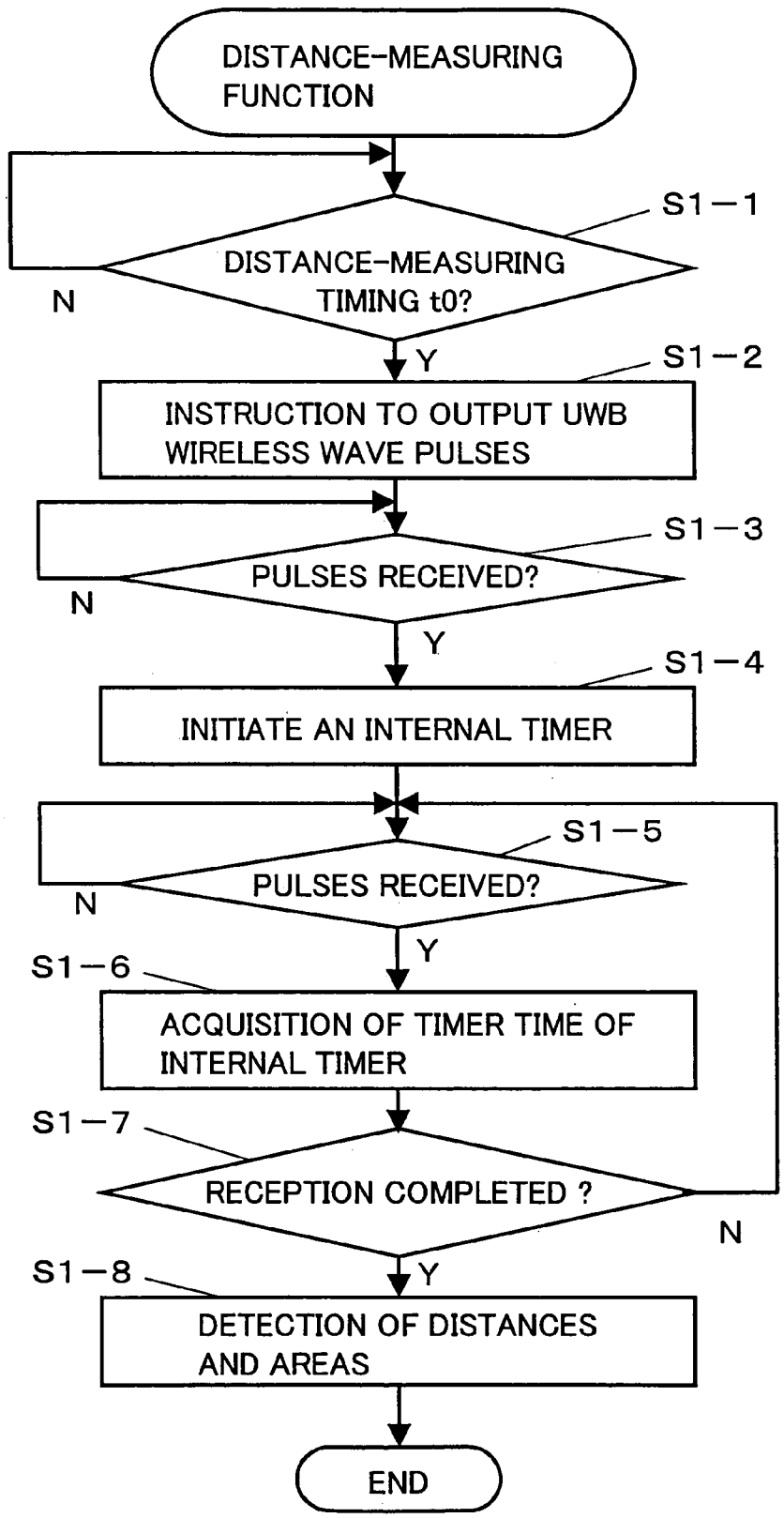
FIG. 7 is a flowchart of the process performed by the controller 23.

FIG. 7 is a flowchart of the distance-measuring function performed by the UWB communication system 11.

At the measuring time t0 (step S1-1), the controller 23 provides the transmitter 21 with instruction and causes the transmitter 21 to output the UWB wireless wave pulse (step S1-2). Then, when the receivers 22-1~22-4 receive the UWB wireless wave pulse output from the transmitter 21 and the controller 23 receives the detection signals from the receivers 22-1~22-4 at step S1-3, the controller 23 initiates a timer integrated therein at step S1-4.

It is noted that the UWB wireless wave pulse received by the receivers 22-1~22-4 is the one which is transmitted by the transmitter 21 at the time t0 and directly reaches the respective receivers 22-1~22-4. Since the receivers 22-1~22-4 are located nearly equidistant from the transmitter 21 by the distance r, the UWB wireless wave pulse will be received by the receivers 22-1~22-4 substantially at the same time in the case of being received directly from the transmitter 21.

The controller 23 starts to monitor the detection signals from the receivers 22-1~22-4 at step S1-5 after initiating the internal timer. When the detection signals are supplied to the controller 23 from the respective receivers 22-1~22-4, the controller 23 acquires the timer times of its internal timer and stores the timer times as a measuring result of the corresponding receivers at step S1-6. When all the detection signals from the receivers 22-1~22-4 are supplied to the controller 23 at step S1-7, the controller 23 calculates the distance L from the obstacle 3 and an existing area A within which the obstacle 3 is located.

Next, ways to derive the distance L and the existing area A are described with reference to FIGS. 8–10.

Figure 8:
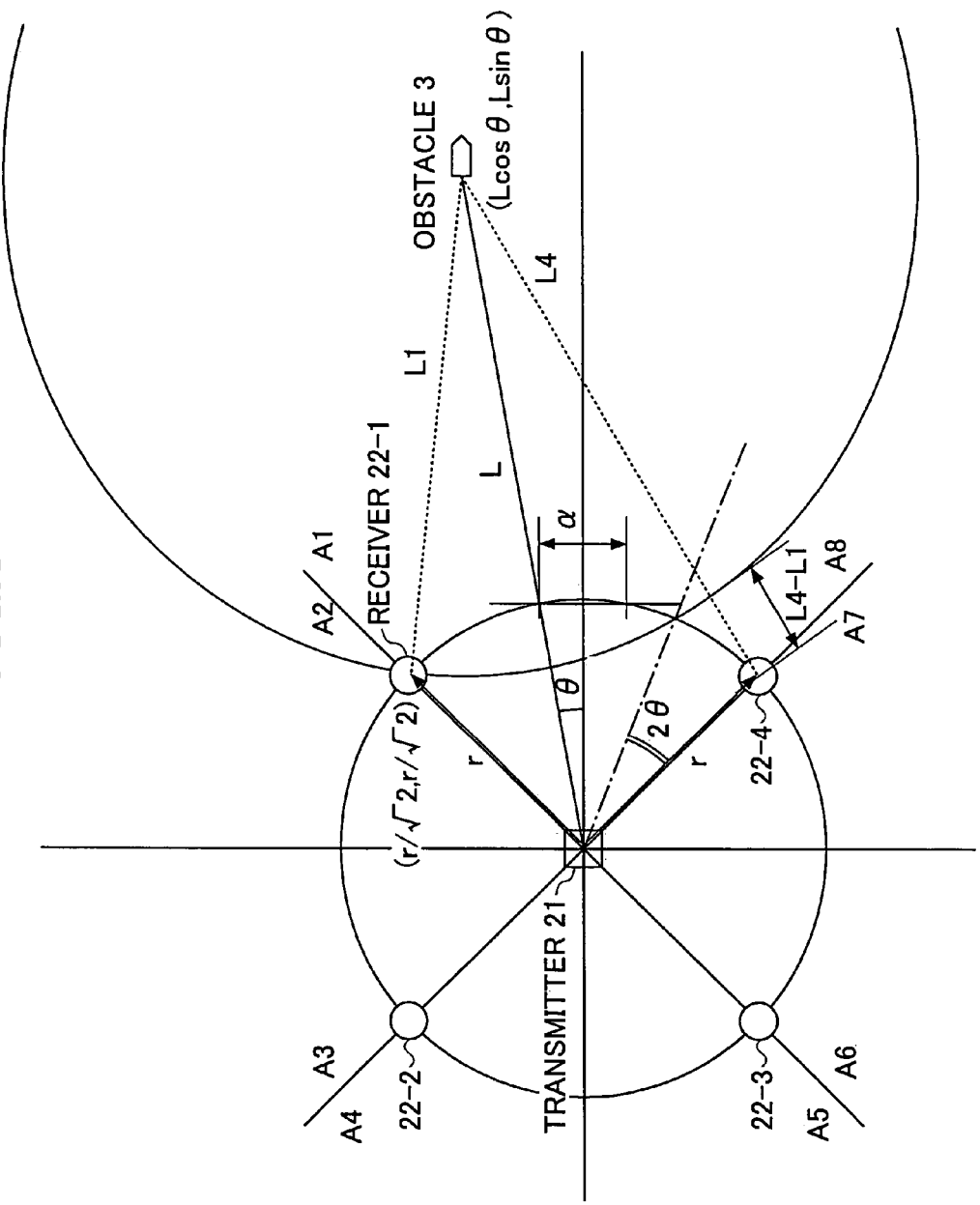
FIG. 8 is a schematic diagram showing a method of deriving the distance L and the existing area A of the obstacle 3.

The receivers 22-1~22-4 are disposed on the circle of radius r whose center corresponds to the location of the transmitter 21 and are evenly spaced 90 degrees apart, as shown in FIG. 8.

The UWB wireless wave pulse emitted from the transmitter 21 will reach the receivers 22-1~22-4 simultaneously because the receivers 22-1~22-4 are located equidistant from the transmitter 21. Further, the UWB wireless wave pulse emitted from the transmitter 21 will be supplied to the obstacle 3. The UWB wireless wave pulse supplied to the obstacle 3 is reflected off the obstacle 3. The wave reflected from the obstacle 3 will reach the receivers 22-1~22-4 in ascending order of distance between the respective receivers 22-1~22-4 and the obstacle 3.

In the example shown in FIG. 8, the reflected wave is to be supplied to the receivers 22-1, 22-4, 22-2, and 22-3 in turn. In this case shown in FIG. 8, from the fact that the reflected wave has reached the receiver 22-1 first it can be seen that the obstacle 3 exists in the area A1 or area A2. Further, from the fact that the reflected wave has reached the receiver 22-4 second it can be seen that the obstacle 3 exists in the area A1.

The relative angle θ and distance L between the obstacle 3 and the transmitter 21 can be derived from the difference in arrival time of the reflected wave between the receiver 22-1 and the receiver 22-4.

The angle θ is given as follows:

$$\theta = \sin^{-1}(\alpha/2r)$$

$$\alpha \approx L4 - L1 = (t1 - t4) \times 3 \times 10^8$$

where $3 \times 10^8$ corresponds to the speed of a radio wave.

The resolution of the measuring can be made higher because the wavelength of the UWB wireless wave pulse is short. For example, in the case of the frequency of 5 GHz, the wavelength is ±6 cm and the resolution is ±6 cm. It is noted that since the measuring can be performed successfully even if the delay of the reflected wave is the half wavelength thereof, the resolution is ±3 cm indeed.

Figure 9:
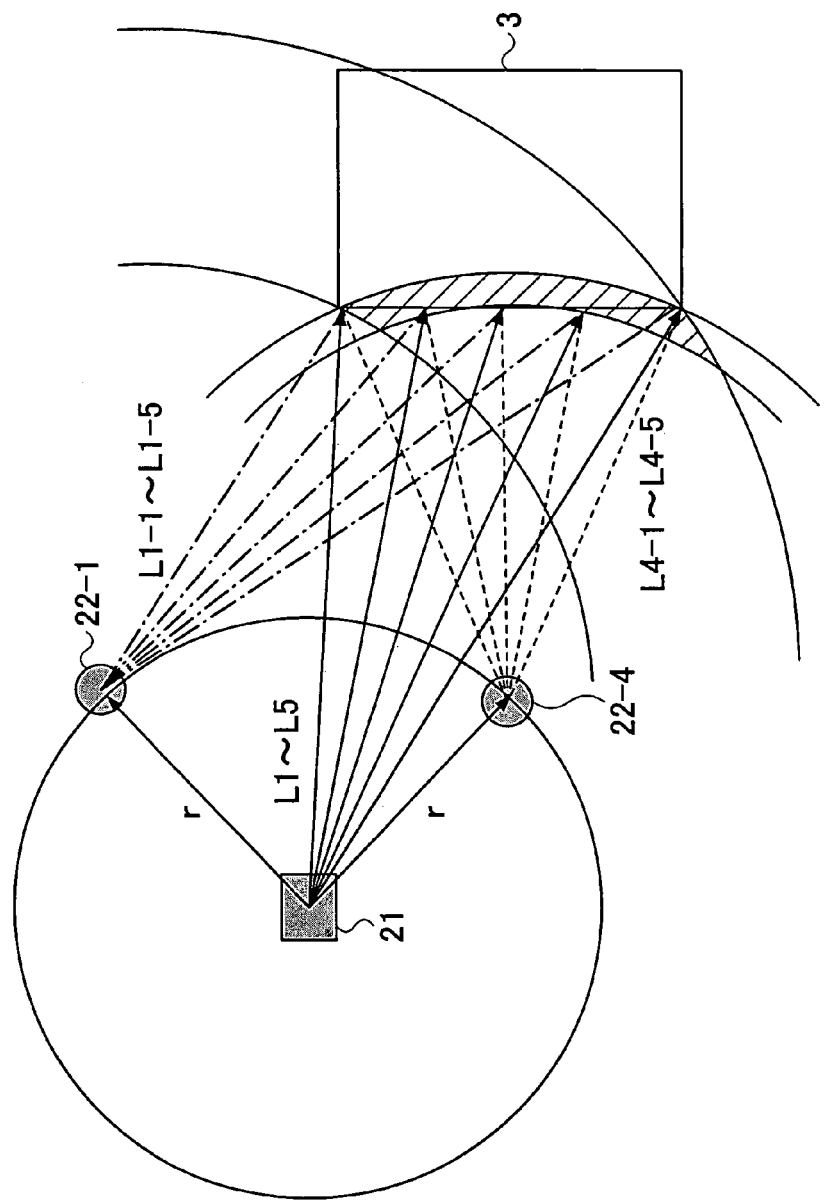
FIG. 9 is a schematic diagram showing a method of deriving the distance L and the existing area A of the obstacle 3.
Figure 10:
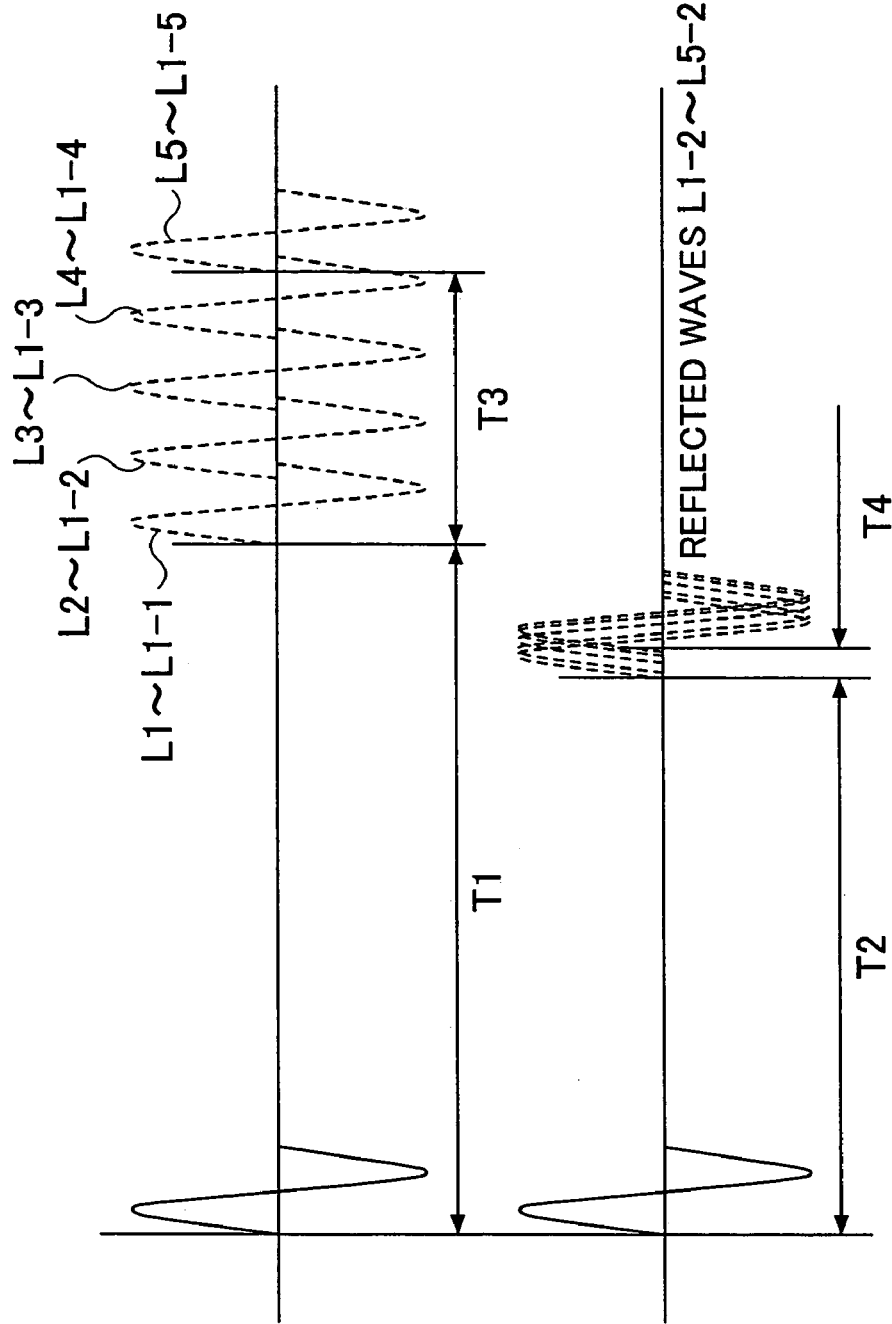
FIGS. 10A and 10B are graphs showing a method of deriving the distance L and the existing area A of the obstacle 3.

As shown in FIG. 9, even if the reflected wave originates from a common obstacle 3, the distances L1-L5 between the obstacle 3 and the transmitter 21, and the distances L1-1~L1-5, L4-1~L4-5 between the obstacle 3 and the receivers 22-1, 22-4, respectively, differ in accordance with the reflected locations on the obstacle 3 and therefore the detection time differs from the receiver 22-1 to the receiver 22-4. The detection signal of the receiver 22-1 has the shape shown in FIG. 10A, which spreads over the time interval T3. Further, in the detection signal of the receiver 22-4 generated is the spread over the time interval T4, as shown in FIG. 10B.

It is possible to determine the size of the obstacle 3 based on the time spread T3 of the detection signal of the receiver 22-1 and the time spread T4 of the detection signal of the receiver 22-4. In the example shown in FIG. 9, it can be determined that the obstacle 3 has the size indicated by the diagonally shaded areas.

When the controller 23 finishes calculating the distance L from the obstacle 3, the area A and the size of the obstacle 3 in this way, the controller 23 displays the value of the distance L calculated at step S1-7, the area A in which the obstacle 3 exists and the size on the display 24.

A driver of the vehicle 1 can narrow down the location of the obstacle 3 by recognizing the distance L from the obstacle 3, the existing area A, that is, the direction, and the size displayed on the display 24. Thus, the driver can avoid the contact or interference with the obstacle 3.

Here, the UWB wireless wave pulse used for detecting the obstacle 3 exhibits high permeability against material (matter) and thus can be used to detect an obstacle such as a vehicle which is located in the place shielded by a shield. Furthermore, since the measuring with high precision in the order of several centimeters can be performed using the UWB wireless wave pulse, it is possible to precisely detect the distance from the obstacle 3.

Accordingly, with the distance-measuring system according to this embodiment, it is possible to accurately measure the distance L and direction to the obstacle 3 with respect to the vehicle and inform the driver of this information.

Although the receivers 22-1~22-4 are disposed evenly spaced 90 degrees apart and centered on the transmitter 21, the arrangement of the receivers can vary with shape and the like of the vehicle.

Figure 11:
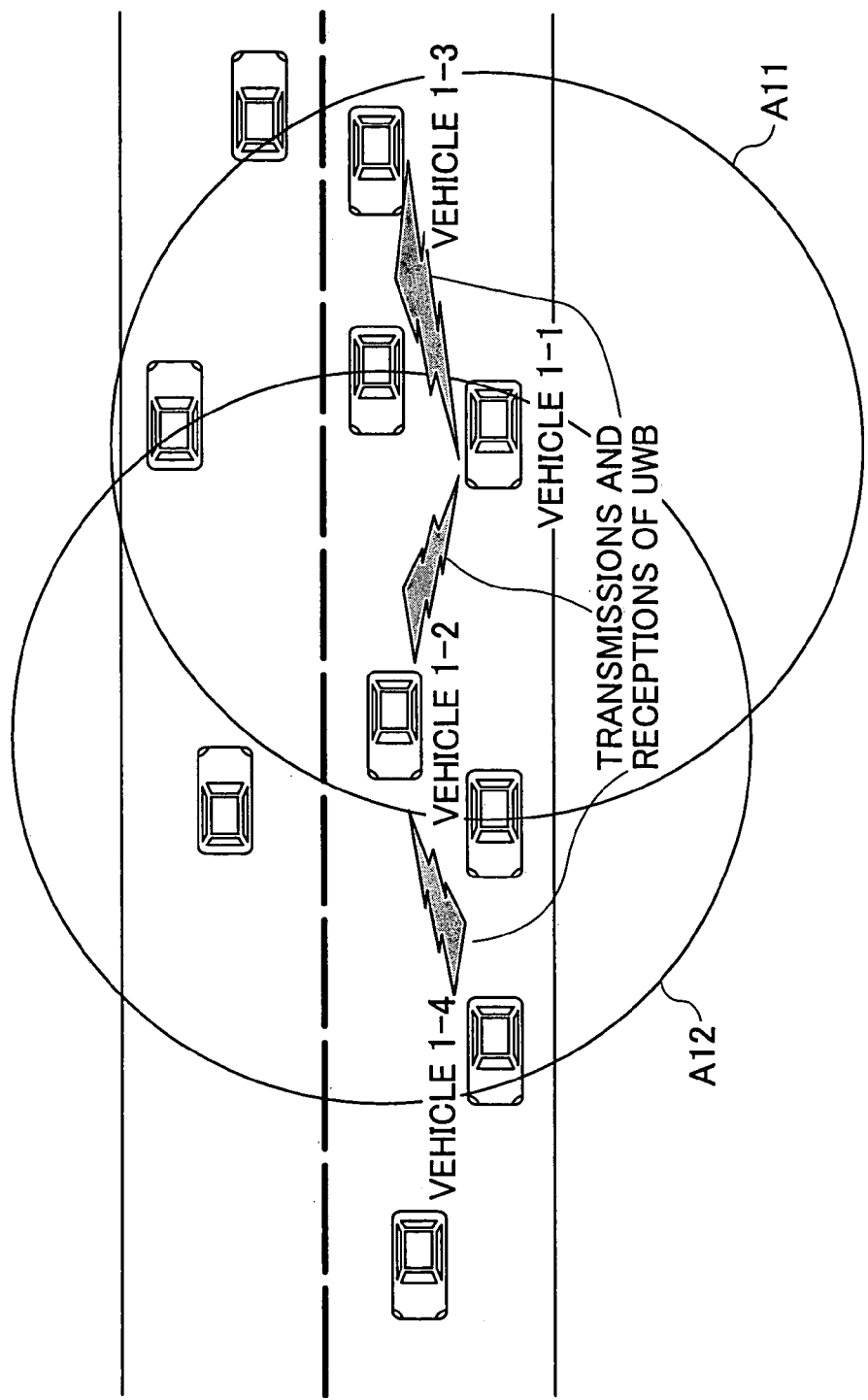
FIG. 11 is a schematic diagram showing operations for the inter-vehicle communication function of the UWB communication system 11.

FIG. 11 shows operations for the inter-vehicle communication function of the UWB communication system 11.

The vehicles 1-2 and 1-3 are equipped with the UWB communication system 11 and exist in the communication area A11 of the UWB communication system 11 of the vehicle 1-1. The state in which the communication between the UWB communication system 11 of the vehicle 1-2 and the UWB communication system 11 of the vehicle 1-1 is possible using the UWB wireless wave pulse is established. Similarly, the state in which the communication between the UWB communication system 11 of the vehicle 1-3 and the UWB communication system 11 of the vehicle 1-1 is possible using the UWB wireless wave pulse is established.

Figure 12:
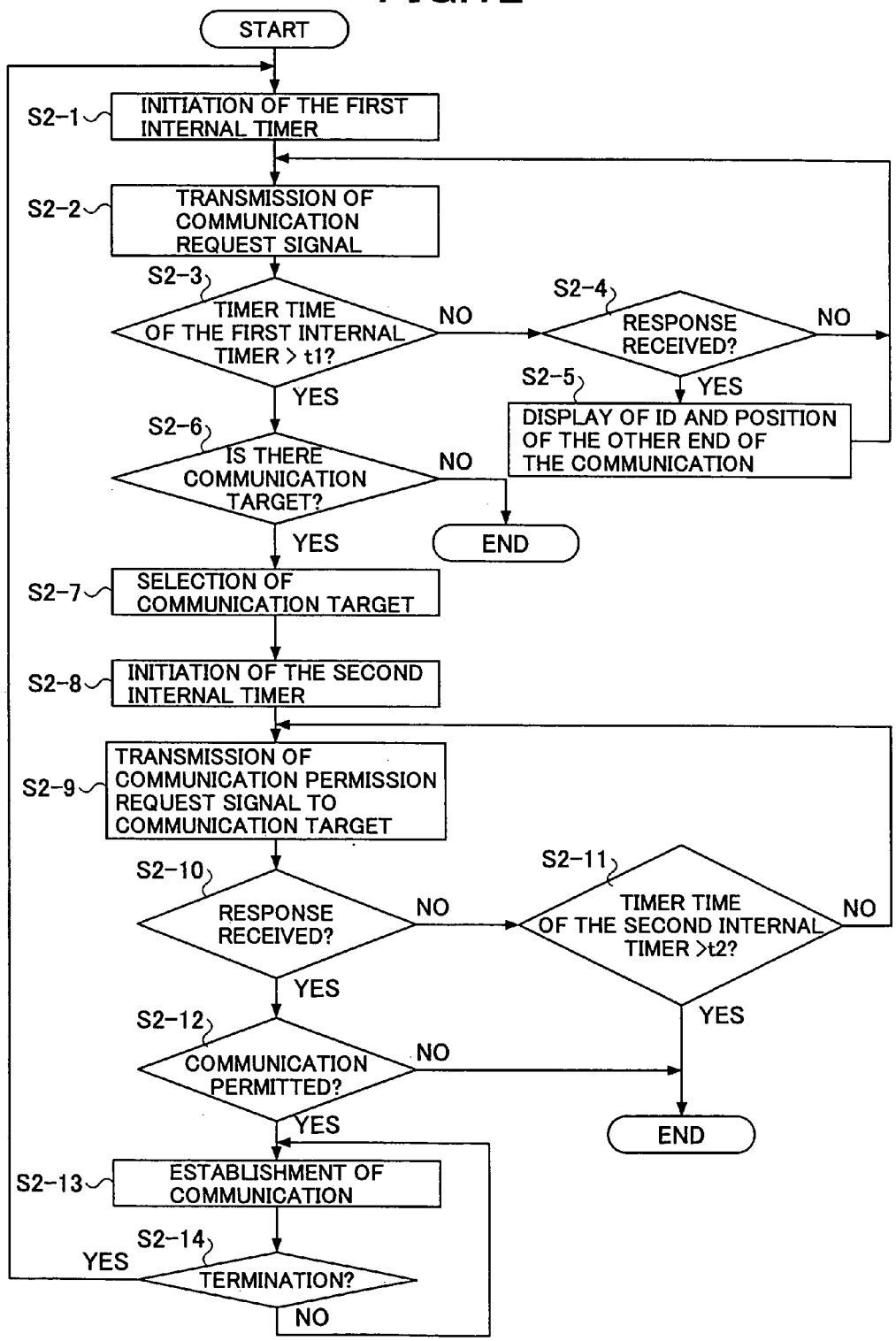
FIG. 12 is a flowchart of the process performed by the controller 23 of the UWB communication system 11 of the vehicle 1-1 for implementing the inter-vehicle communication function.

FIG. 12 is a flowchart of the process performed by the UWB communication system 11 for implementing the inter-vehicle communication function.

First, the controller 23 initiates the first internal timer at step S2-1. Then, at step S2-2, the controller 23 controls and instructs the transmitter 21 to transmit a communication request signal by the UWB wireless wave pulse. At step S2-2, the controller 23 checks the first internal timer to determine whether its timer time exceeds a predetermined time t1.

If the timer time of the first internal timer is less than the time t1, the controller 23 determines whether a response from an other UWB communication system 11 is received at step S2-4. If the response from an other UWB communication system 11 has been received at step S2-4, the controller 23 displays the ID and the location of the communication target from which the response is returned on the display 24 at step S2-5. This allows the driver to recognize the communication target. The ID may be included in the response data. The location may be obtained by the aforementioned distance-measuring function. The position information derived by the navigation system installed in the vehicle of the communication target may be included in the response data to be sent.

If the timer time of the first internal timer reaches the time t1 at step S2-3, the controller 23 determines whether there is a communication target at step S2-6. If there is no communication target at step S2-6, the process is terminated as the next logical step. On the other hand, if there is a communication target at step S2-6 and the communication target displayed on the display 24 is selected at step S2-7, the controller 23 initiates the second internal timer at step S2-8.

Then, the controller 23, at step S2-9, controls and instructs the transmitter 21 to transmit a communication request signal to the selected communication target. The controller 23 determines whether there is a response from the selected communication target, and if there is no response in the timer time T2 of the second internal timer (step S2-11), the process is terminated as a result of determining there is no intention of performing the inter-vehicle communication on the communication target side.

If there is a response from the selected communication target at step S2-10, the controller 23 determines whether the response is an affirmative response at step S2-12. If the response from the selected communication target corresponds to a communication reject, the process is terminated. On the other hand, if the response corresponds to a communication affirmation, the controller 23 establishes the inter-vehicle communication at step S2-13. When the communication is shut down at step S2-14, the process returns to step S2-1 to re-establish communication.

Next, the process of the controller 23 of the UWB communication system 11 on the communication target side (i.e. the requested side) is described.

Figure 13:
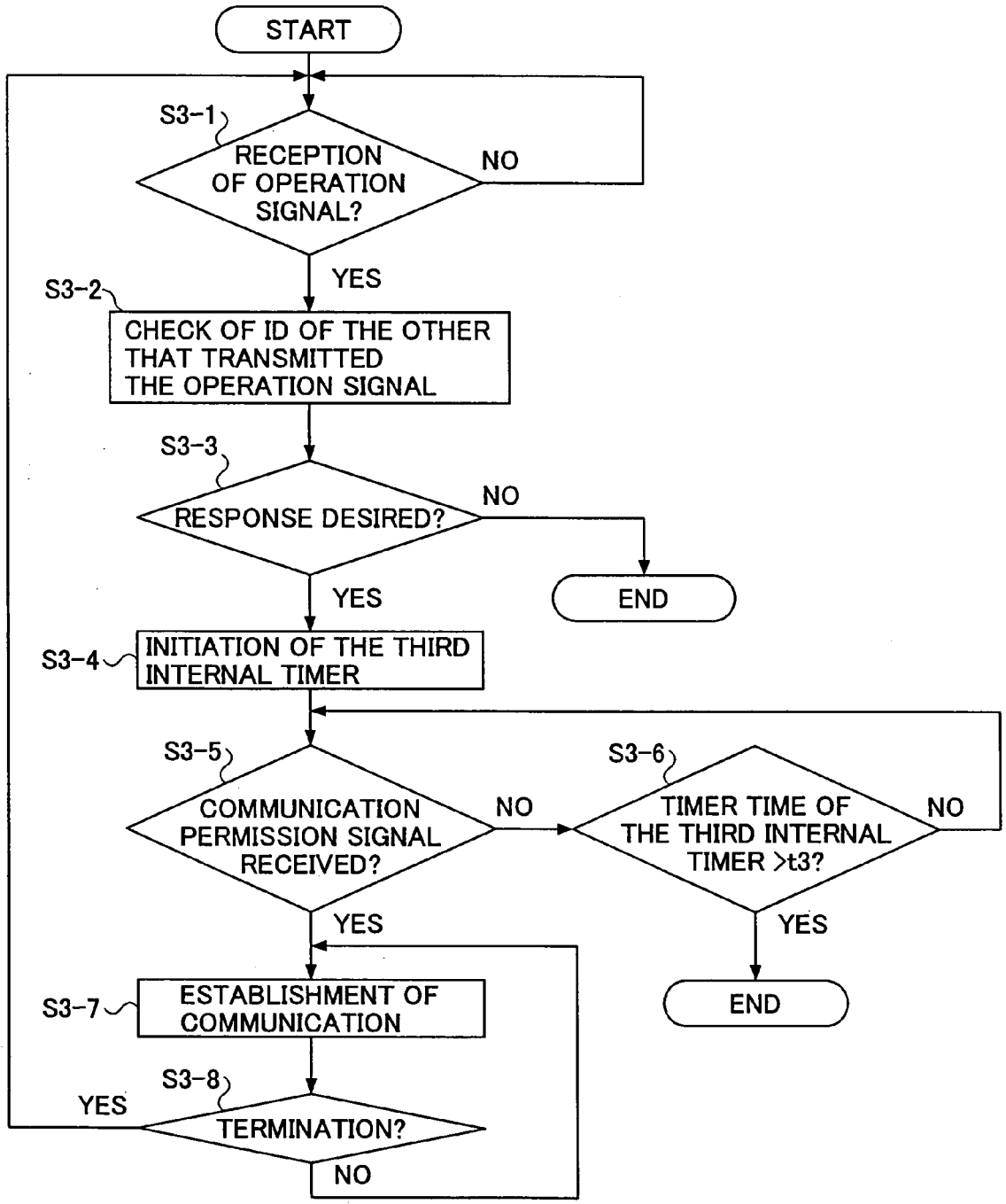
FIG. 13 is a flowchart of the process performed by the controller 23 of the UWB communication system 11 of the vehicle 1-2 for implementing the inter-vehicle communication function.

When the controller 23 detects the reception of the communication request signal at step S3-1 in FIG. 13, the controller 23 provide an instruction to display the ID of the communication request side on the display 24 at step S3-2. The controller 23 terminates the process if the operation for rejecting the communication request is done by a user at step S3-3. The controller 23 initiates the third internal timer if the operation for accepting the communication request is done at step S3-4.

If there is no communication permission signal received from the other side in response to the communication permission signal at step S3-5 before the timer time of the third internal timer reaches t3 at step S3-6, the controller 23 terminates the process. Otherwise, the controller 23 establishes the inter-vehicle communication with the other side at step S3-7. The controller 23 keeps the inter-vehicle communication until the communication is terminated at step S3-8.

The above-mentioned process enables the communication between the vehicle 1-1 and the vehicle 1-2. It is noted that once the communication between the vehicle 1-1 and the vehicle 1-2 starts, the vehicle 1-1 can communicate with an other vehicle 1-4, which is located within the communication area of the vehicle 1-2, via the vehicle 1-2. If the vehicle 1-2 moves out of the communication area A11, the vehicle 1-1 may request the vehicle 1-2 to resend information for a predetermined time interval, and if no communication can be established in the predetermined time interval, the communication network may be temporarily shut down. In this way, a quick communication with the vehicle located out of the communication area can be archived via an other vehicle located within the communication area using the UWB wireless wave pulse. The UWB communication system enables communication at a high data rate and communication of moving images.

Figure 14:
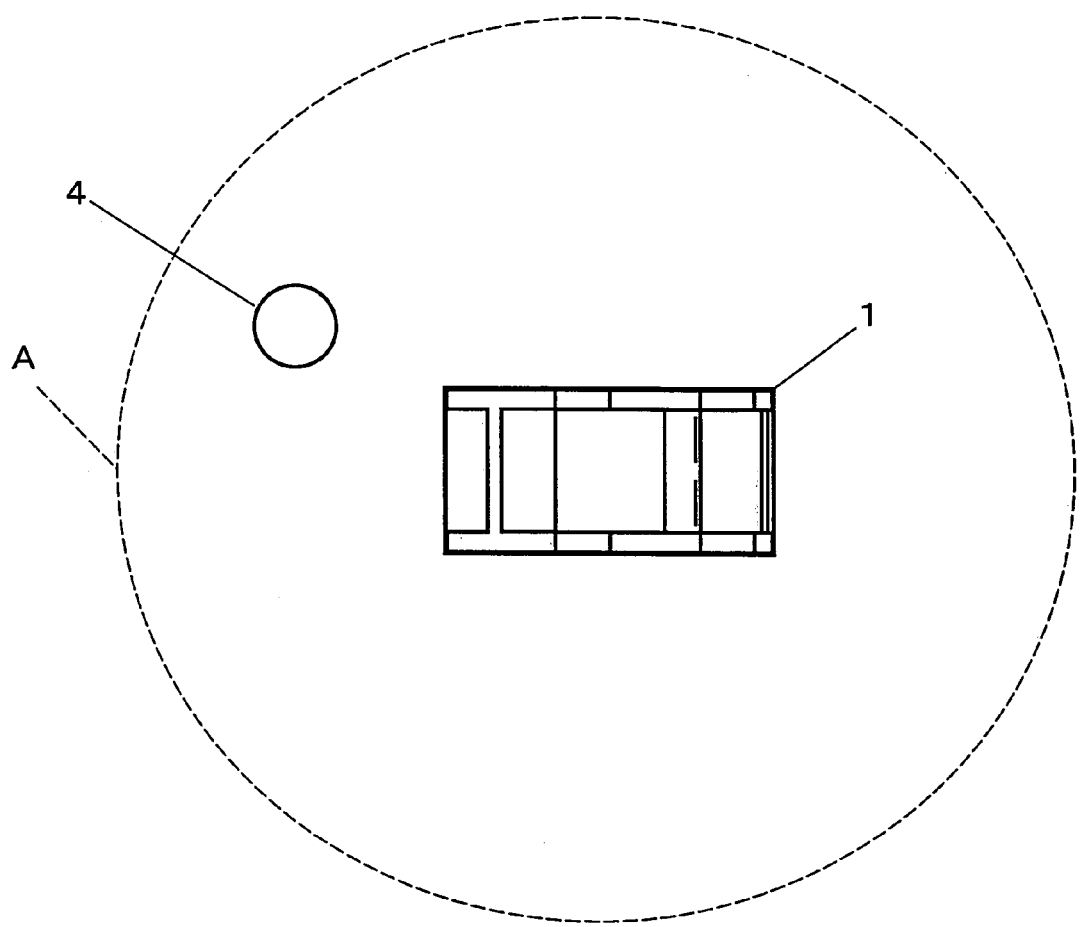
FIG. 14 is a schematic diagram for illustrating the anti-theft function.

FIG. 14 is a diagram for illustrating the anti-theft function. The anti-theft function generates an alarm if a moving object 4 with a predetermined size exists in a predetermined area centered on the vehicle 1 for a predetermined time. In this case, the UWB wireless wave pulse is used for detecting the moving object 4.

Figure 15:
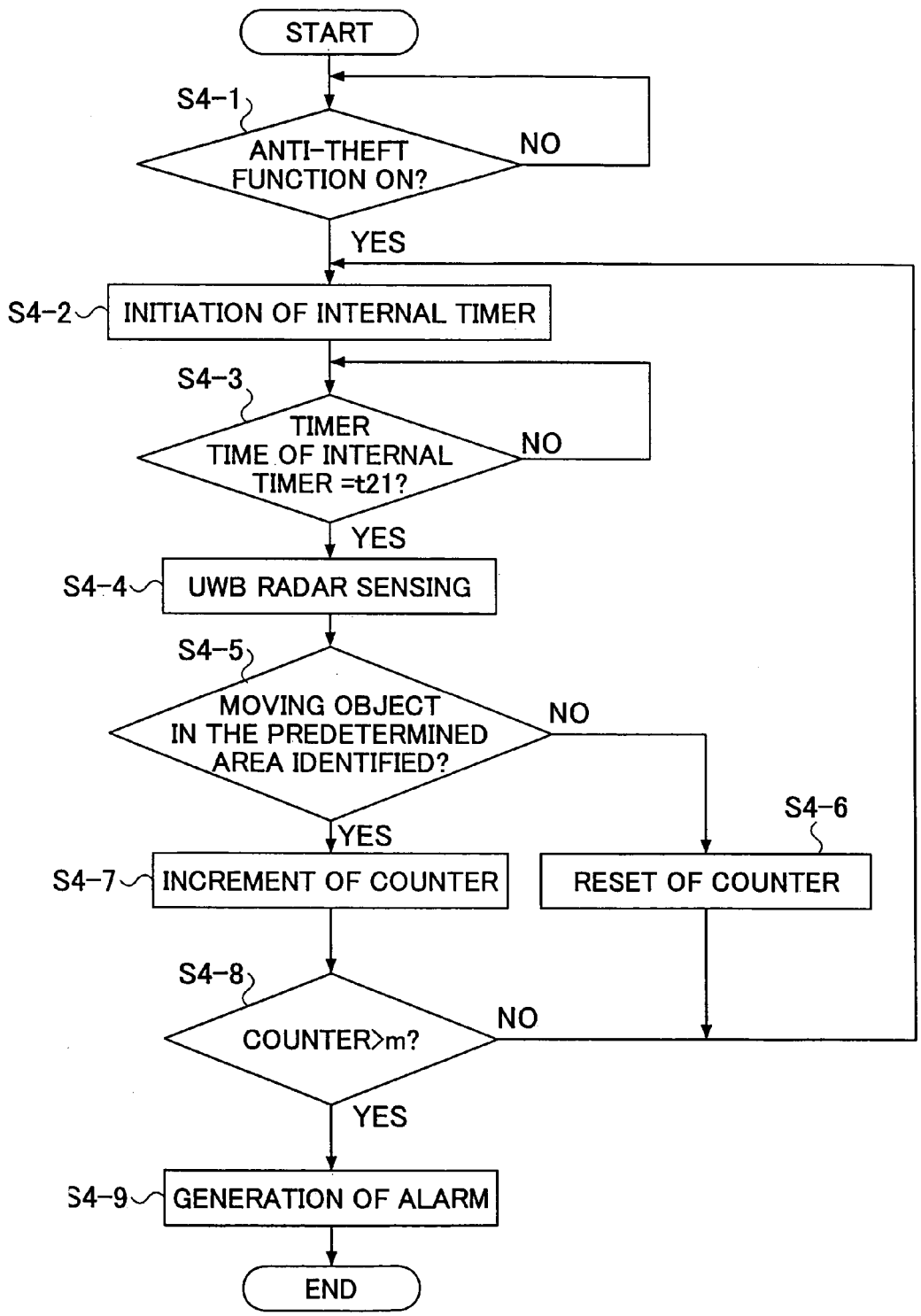
FIG. 15 is a flowchart of the process for the anti-theft function performed by the controller 23 of the UWB communication system 11 of the vehicle 1-1.

FIG. 15 is a flowchart of the process for the anti-theft function performed by the controller 23 of the UWB communication system 11 of the vehicle 1.

When the anti-theft function is activated at step S4-1, the controller 23 initiates an internal timer at step S4-2. Then, when the timer time of the internal timer reaches a predetermined time t21 at step S4-3, the UWB communication system 11 starts sensing for detecting a moving object 4 at step S4-4.

The controller 23 determines whether a moving object 4 with a predetermined size exists in a predetermined area A at step S4-5. The distance-measuring function of the UWB communication system 11 is used for sensing the moving object 4.

If no moving object 4 with a predetermined size exists in a predetermined area A at step S4-5, the controller 23 resets a counter value of an internal counter to "0" at step S4-6 and returns to step S4-2. On the other hand, if a moving object 4 with a predetermined size exists in a predetermined area A at step S4-5, the controller 23 increments the internal counter at step S4-7.

The controller 23 determines whether or not the counter value of the internal counter exceeds a predetermined value m at step S4-8. If the counter value of the internal counter is less than the predetermined value m at step S4-8, the process returns to step S4-2 and repeats because there is a possibility that the moving object 4 just passed near to the vehicle. If the counter value of the internal counter exceeds the predetermined value m at step S4-8, the controller 23 provides an instruction to generate an alarm at step S4-9 because the moving object 4 has stayed near the vehicle more than a predetermined time interval (m×t21) and there is a possibility of theft.

The alarm may include generating sounds and light or providing a notification of the theft to a mobile terminal of the owner of the vehicle. The notification may be sent through a wireless communication system such as a mobile phone as well as through the UWB communication system 11. Then, the image of the vehicle's surroundings captured by the monitoring camera of the monitoring system 15 may be sent to the mobile terminal and the like.

Next, the communication inside the cabin of the vehicle is described. In this embodiment, the communication between the UWB communication system 11, the radar system 12 and the control system 16 is implemented using the UWB communication.

Figure 16:
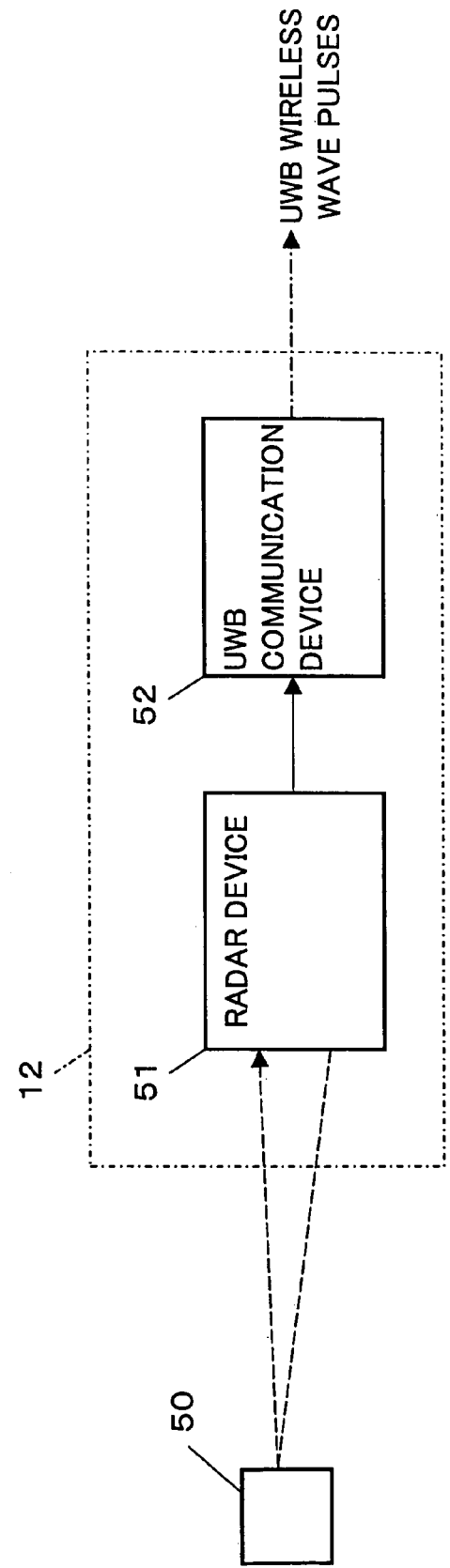
FIG. 16 is a block diagram of the radar system 12.

FIG. 16 is a block diagram of the radar system 12. The radar system 12 includes a radar device 51 and a UWB communication device 52. The radar device 51 monitors the vehicle 50 ahead of the vehicle 1 and supplies radar images and the like to the UWB communication device 52. The UWB communication device 52 transmits information, such as a radar image or information indicating the relative location of the vehicle 1 with respect to the vehicle 50, to the UWB communication system 11 or the control system 16 at a high rate using the UWB wireless wave pulse.

The radar image or the location information indicating the relative location of the vehicle 1 with respect to the vehicle 50 is received by the UWB communication system 11 from the radar system 12 using the receivers 22-1~22-4 and the radar image is subject to image processing at the controller 23 to be displayed on the display 24. The control system 16 receives the radar image or the location information indicating the relative location of the vehicle 1 with respect to the vehicle 50 from the radar system 12 and analyzes the distance between vehicles for generating an alarm or controlling the engine and the like.

Figure 17:
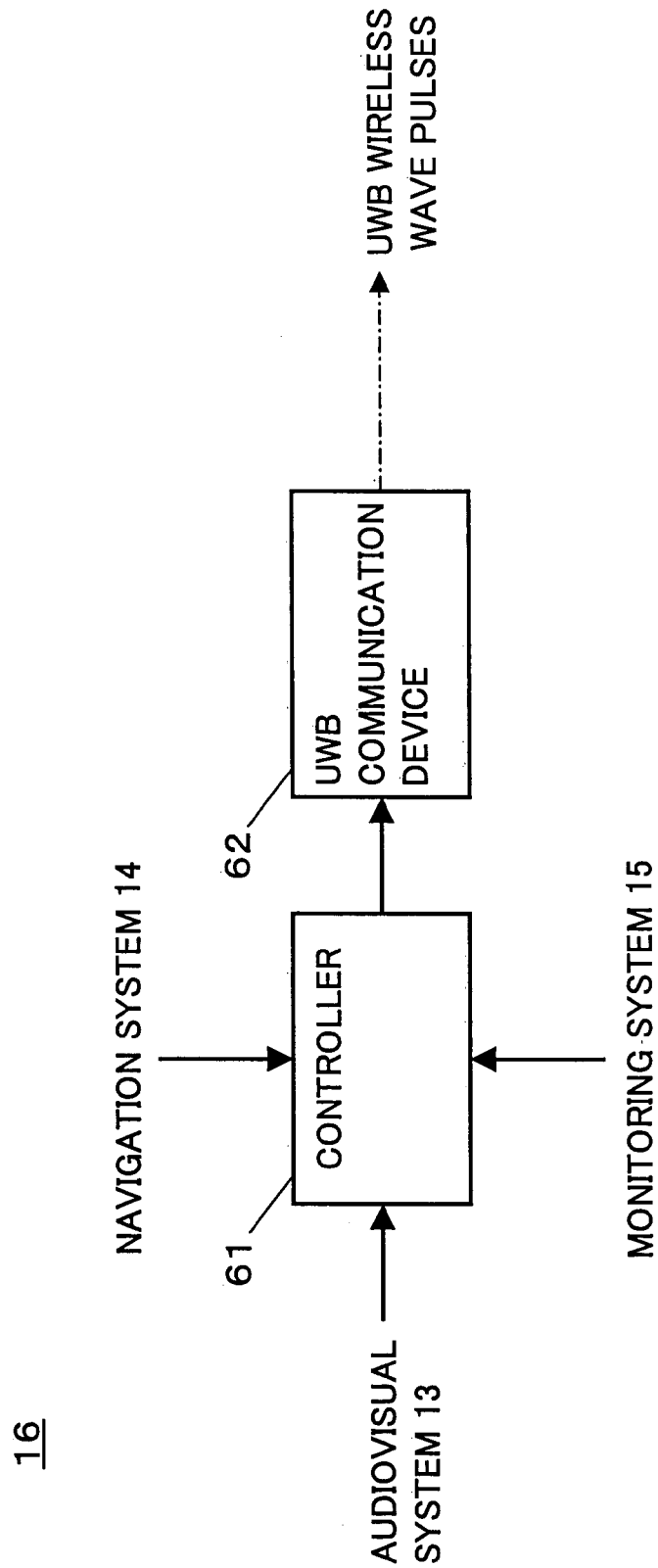
FIG. 17 is a block diagram of the control system 16.

FIG. 17 is a block diagram of the control system 16. This control system 16 includes a controller 61 and a UWB communication device 62.

The controller 61 receives the audio or visual information from the audiovisual system 13, the navigation screen information from the navigation system 14 and the monitoring image information from the back-monitoring camera and processes this information. The images processed by the controller 61 are sent to the UWB communication device 62. The UWB communication device 62 transfers the image information supplied from the controller 61 to the UWB communication system 11 using the UWB wireless wave pulse. The UWB communication system 11 displays the image information from the controller 61 on the display 24.

In this way, because communication at a high rate can be implemented by using the UWB wireless wave pulse for the exchange of information between components inside the cabin of the vehicle 1, it becomes possible to eliminate a connection wire such as a wire harness inside the cabin of the vehicle 1 and communicate information such as an image without degrading its quality. Further, it facilitates installation of electronic components inside the cabin of the vehicle 1.

Although the detection of other vehicles ahead of the vehicle by the radar system 12 and the detection of the obstacle by the distance-measuring function of the UWB communication system 11 are performed independently in the aforementioned embodiment, the function of the radar system 12 may be performed by the UWB communication system 11 if the maximum distance, which can be measured using the UWB wireless wave pulse, can be extended.

Although the application in which the UWB communication system is installed in the vehicle is illustrated in the aforementioned embodiment, it is also possible to implement a wireless tag system using the UWB communication system according to the present invention, as be described below.

Figure 18:
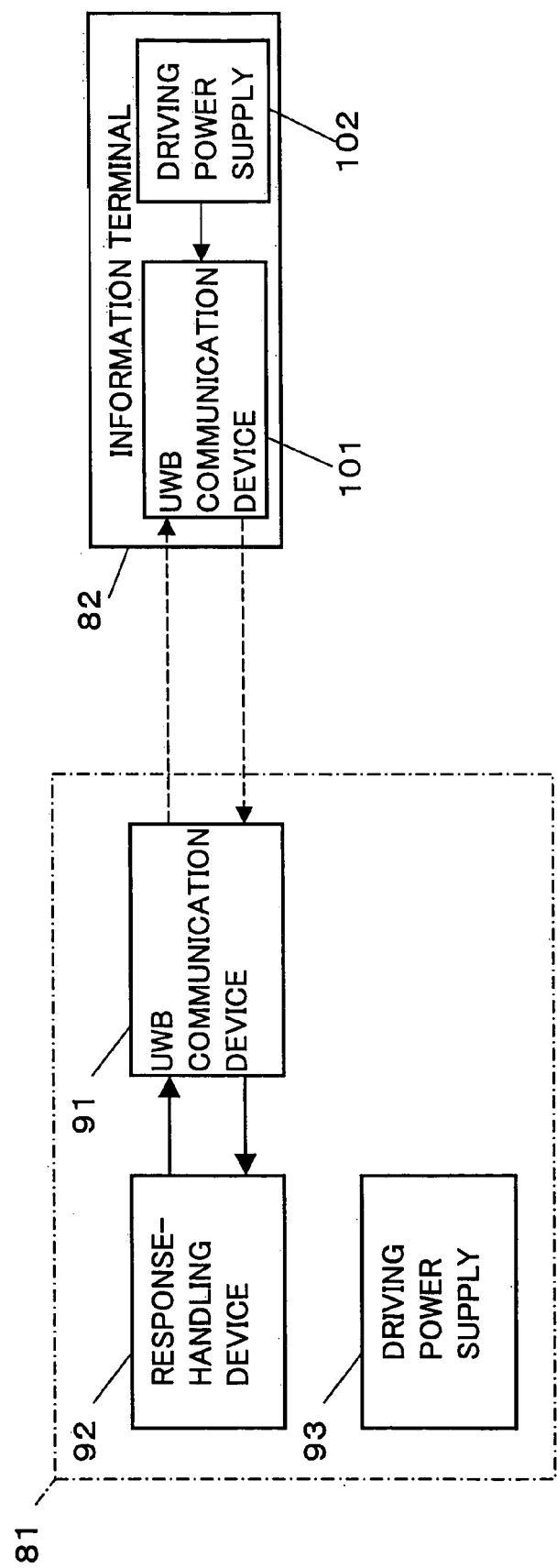
FIG. 18 is a block diagram of the wireless tag system.

FIG. 18 is a block diagram of the wireless tag system. This wireless tag system 71 is comprised a tag 81 and a mobile terminal 82.

The tag 81 is comprised of a UWB communication device 91, a response-handling device 92 and a driving power supply 93.

The UWB communication device 91 receives a response request signal transmitted using UWB wireless wave pulse from the mobile terminal 82 and sends response information from the response-handling device 92 using UWB wireless wave pulse. When the response-handling device 92 receives the response request signal, it supplies an ID and the like allocated previously as the response information to the UWB communication device 91. The driving power supply 93 is comprised of a battery and the like and supplies driving power to the UWB communication device 91 and the response-handling device 92.

The mobile terminal 82 is comprised of a UWB communication device 101 and a driving power supply 102. The UWB communication device 101 has the same configuration as the UWB communication device 11 shown in FIG. 4. In the mobile terminal 82, the controller 23 sends a response request to the transmitter 21. The transmitter 21 outputs the response request from the controller 23 using UWB wireless wave pulse. The response request transmitted by the transmitter 21 is sent to the tag 81. The tag 81 transmits a response in response to the response request from the mobile terminal 82 using UWB wireless wave pulse. The driving power supply 102 supplies driving power to the UWB communication device 101.

The receivers 22-1~22-4 of the mobile terminal 82 receive the response generated by the UWB wireless wave pulse from the tag 81 and the mobile terminal 82 detects the distance and the direction to the tag 81 and displays this information on the display 24. This enables the precise detection of the location of the tag 81 and allows a user to easily locate an article to which the tag 81 is attached.

It is noted that the driving power supply 93 may be comprised of other than a battery. For example, the voltage retrieved by integrating the UWB wireless wave pulses from the mobile terminal 82 can replace the driving power supply 93 or the combination thereof can be used.

The UWB communication system requires less power because it uses the wide-band pulses. Thus, by using UWB wireless wave pulses in the wireless tag communication it becomes possible to reduce power consumption and downsize the driving power supply 93 integrated in the tag 81 and thus downsize the tag 81 itself.

Furthermore, since frequency conversion is not performed in the UWB communication system in contrast to a traditional narrow-band wireless communication system, a mixer circuit and an IF filter become unnecessary, which simplifies the construction of the overall circuit. Further, since the distance and the direction to the tag 81 can be determined precisely, it becomes easy to locate the tag 81.

The present invention is not limited to the above-described embodiments, and variations and modifications may be made without departing from the scope of the present invention.

What is claimed is:

1. A communication device comprising:
    a transmitter for transmitting an ultra wide band wireless wave pulse;
    a plurality of receivers which are disposed equidistant from the transmitter and receive the ultra wide band wireless wave pulse; and
    distance-measuring equipment which detects a distance or a direction to an object based on reception times when each of the receivers receives the ultra wide band wireless wave pulse directly from the transmitter and an object-reflected wave thereof.

2. The communication device as claimed in claim 1, wherein communication is performed by the transmitter and the receivers using the ultra wide band wireless wave pulse.

3. A communication system comprising:
    a detector including a transmitter which transmits a response request using an ultra wide band wireless wave pulse; a plurality of receivers which are disposed equidistant from the transmitter and receive the ultra wide band wireless wave pulse; and distance-measuring equipment which detects a distance or a direction to an object based on reception times when each of the receivers receives the ultra wide band wireless wave pulse directly from the transmitter and an object-reflected wave thereof; and a response device including a receiver which is installed on the object and receives the ultra wide band wireless wave pulse transmitted from the transmitter of the detector; and a transmitter which transmits a response request using another ultra wide band wireless wave pulse in response to the reception of the ultra wide band wireless wave pulse from the detector by the receiver of the response device.

* * * * *

UNITED STATES PATENT AND TRADEMARK OFFICE
CERTIFICATE OF CORRECTION

| | | |
|---|---|---|
| PATENT NO. | : 7,102,537 B2 | Page 1 of 1 |
| APPLICATION NO. | : 10/781797 | |
| DATED | : September 5, 2006 | |
| INVENTOR(S) | : Hiroto Inoue et al. | |

It is certified that error appears in the above-identified patent and that said Letters Patent is hereby corrected as shown below:

On The Title Page, Item (57) (Abstract), Line 10, after "receive" change "a" to --an--.

Signed and Sealed this

First Day of May, 2007

JON W. DUDAS
*Director of the United States Patent and Trademark Office*